June 4, 1963 F. M. DAY 3,092,184
THRUST AUGMENTATION FOR FLUID CURRENT PROPULSION MOTORS
Filed April 7, 1960

F. M. DAY
INVENTOR

BY Homer R. Montague
ATTORNEY

United States Patent Office 3,092,184
Patented June 4, 1963

3,092,184
THRUST AUGMENTATION FOR FLUID CURRENT PROPULSION MOTORS
Frederick M. Day, 2903 W. Palm Lane, Phoenix, Ariz.
Filed Apr. 7, 1960, Ser. No. 20,628
4 Claims. (Cl. 170—135.28)

This invention has to do with fluid current motors, and particularly with means for augmenting the propulsive thrust of propellers, air screws and the like as employed for the propulsion of aircraft, whether of fixed wing, rotary wing or direct-reactive vertical lift or hovering types.

I have discovered that the effective thrust of fluid current impellers, such as airplane propellers, can be increased many-fold by employing therewith the thrust-augmenting principle of vortical flow, such that the thrust-producing propeller is continuously maintained in an energetic environment of compressed, vortically rotating fluid preferably directed counter to the rotation sense of the propeller itself.

Whether the operation of my invention is looked upon as a manifestation of thrust increase arising from the improvement in apparent fluid density at the conventional propeller, or from the standpoint of an increase in the relative wind, or even as due to the operation of Bernoulli's theorem in local vortices in a layer adjacent the leading surface of the rotation plane of the propeller, are considerations of theory with which the present disclosure is not directly concerned. Whatever the cause or source of the effect, I have sufficiently demonstrated its reality and utility in vastly increasing either horizontal or vertical thrust of such conventional propellers for both propulsion and sustentation uses.

Briefly, my invention consists in providing, just ahead of the pitched blade propeller of conventional type, an auxiliary pump or fan of the centrifugal compression type, driven preferably counter to the rotation direction of the propeller so as to produce at its leading or forward surface a compressed layer of air rotating at high speed in the opposite rotational sense. The auxiliary pump or fan is not shrouded on the surfaces perpendicular to its rotation axis, but is open both fore and aft to permit free ingress of air at its own "forward" surface, and free interaction of the rearwardly lying vortical air mass with the counter-rotating pitched propeller. Conveniently, although not necessarily, the centrifugal pump or fan may be driven by a shaft which is concentric or coaxial with the propeller shaft, and by suitable gearing from the same engine or power source. Also, the blades of the centrifugal compressor may be slightly canted to give the compressed air an axial component towards the propeller.

It is important to recognize the distinguishing feature of the present invention as compared with merely concentric, or even concentrically counter-rotating multiple propellers or air screws. In all such prior arrangements with which I am familiar, a plurality of pitched propellers are merely employed in tandem, all operating to give axial impetus to essentially the same air stream. The present invention differs markedly, as already stated, in that my fore-fan produces no direct axial flow, or at least no amount of axial flow which would be significant in the sense of propulsion. Instead, its function is exclusively that of defining a region of compressed high-speed vortical action directed preferably counter to the mechanical rotation of the pitched propeller, by means of the centrifugal compression and ejection towards the propeller of an annular or ring-shaped air mass analogous to a tornado.

In addition to its applications in propulsion as indicated above, the invention is also useful in improving the thrust or flow characteristics of other systems utilizing the airscrew principle. Thus, it may be applied to fans and compressors generally, rotating liquid pumps, and the like.

The invention will best be understood by considering the following detailed specification of certain preferred and exemplary embodiments thereof, taken in connection with the attached drawings, in which.

Essentially, two elements make up the novel combination. These are (1) a bladed disc similar in function and shape to a conventional rotating propeller, by which name it will hereinafter be called, and (2) a centrifugal-type rotating fluid impeller of design suitable to create near its periphery a large mass of rapidly rotating air. This second element will hereinafter be designated briefly as the "impeller."

It is my discovery that these two elements in combination with power means for rotating them, preferably in opposite directions, represent a new and unique system for increasing the propulsive effect of systems embodying the airscrew principle.

Figure 1:
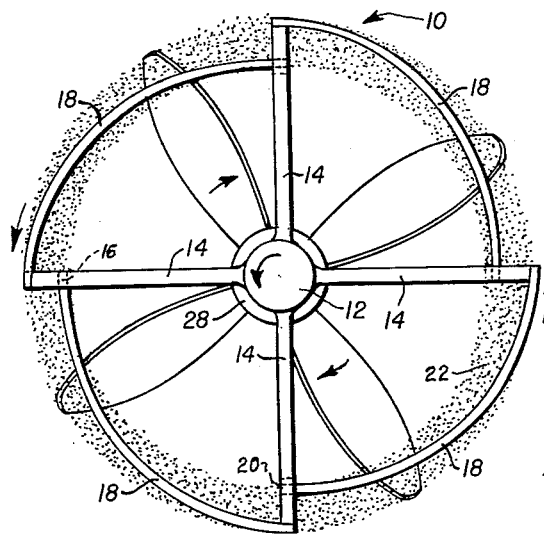
FIGURE 1 is a schematic front elevation of a composite fluid-current propulsion or sustentation device in accordance with the invention.
Figure 2:
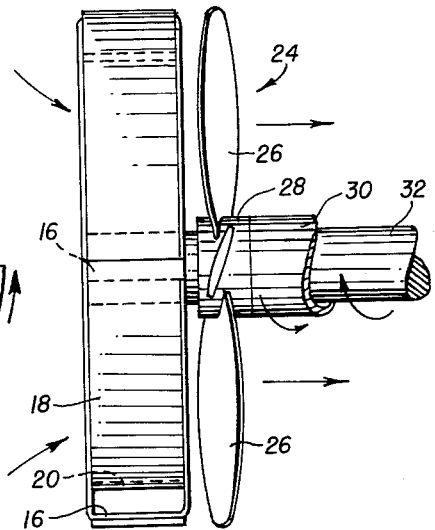
FIGURE 2 is a side view thereof.

The impeller and propeller are shown in a typical relationship in FIGURES 1 and 2 of the drawings, in which the impeller 10 consists of a central disc or hub 12 from which open-sided support or spoke frames such as 14 extend radially outward. The outer closing bar 16 of each spoke frame serves as the support for the outer end of one of four (by way of example) flat blades 18 which curve inwardly for connection at a point of smaller radius defined by a transverse bar 20 secured upon the next following spoke frame 14. It is to be noted that there are no transverse closure plates, but that both the fore and aft terminal planes of the impeller are open. Rotation of the impeller 10 in the direction indicated by arrows thus produces a rapidly rotating highly compressed annular and vortical mass of air in the region indicated by stippling at 22.

Close behind the impeller 10 in FIGURE 1, or to its right in FIGURE 2, is the concentric propeller 24, here shown as having four radial pitched blades 26 carried by the usual central hub 28. Propeller 24 is arranged on a shaft 30 concentrically about the shaft 32 of impeller 10, and the two are rotated preferably in opposite directions by suitable gearing from a single engine, or of course by suitable separate drive sources.

It is fundamental in propeller theory that the propulsive force of a propeller increases as the relative velocity of the airstream increases, and thus if U be taken as the relative airstream velocity obtained from the propeller 24 without the impeller 10, and U' be the velocity contribution of the impeller 10 to air entering the propeller 24, then a gross air velocity of U+U' will be obtained. Also, assuming that U' is of the same order as U, then a thrust increase of as much as four times over that of the propeller alone could theoretically result, each acting on the same amount of fluid.

Many attempts have previously been made to overcome the serious loss of thrust per unit mass of air passing through a propeller at low absolute vehicle velocities. This is due, in part, to the behavior of the air before it enters the propulsive mechanism. The impeller described above overcomes some of this loss, by its compressor action and by the operation of its strong vortical action on such air.

Figure 3:
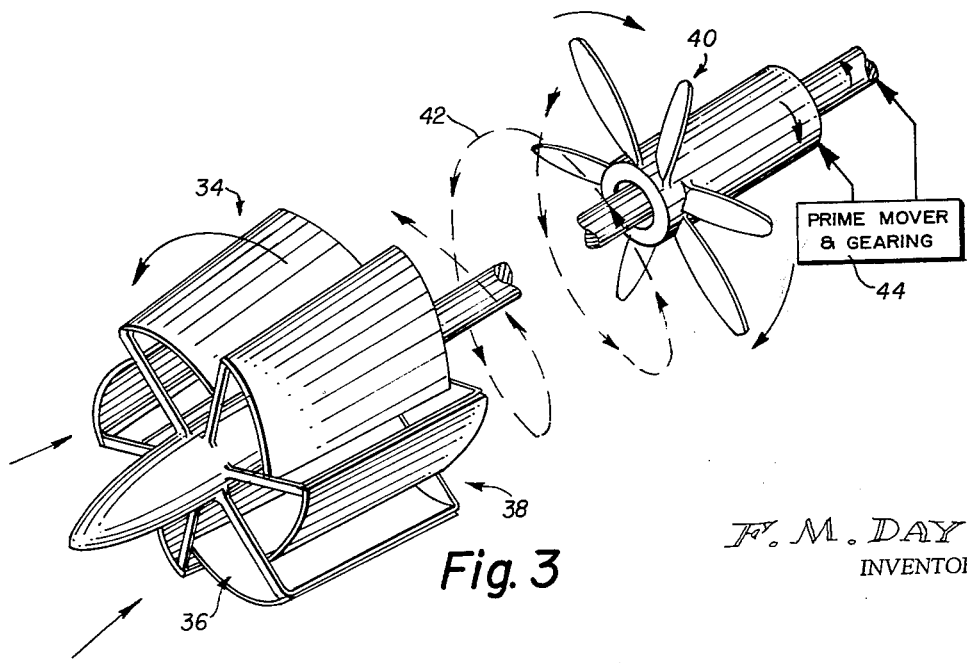
FIGURE 3 is an exploded perspective view of the main parts of a modified embodiment of the invention.

In the modification shown in exploded perspective in FIGURE 3 of the drawings, the impeller 34 is generally as described above, except that it is here provided in a six-bladed form, and each blade is canted or tapered so that the gross area at the entering or leading surface 36 is smaller than that at the discharge or trailing surface 38. The vortical path of the compressed air leaving impeller 34 and passing directly into the propeller 40 is shown schematically by the helical track 42. Propeller 40 is here shown as also of six-bladed type, merely to illustrate that the number of blades is not a critical factor in the invention. A power source, such as an engine, motor or the like is indicated at 44, with necessary gearing or the like to provide the desired rotation of the shafts as above described.

While the invention has been disclosed herein in connection with certain exemplary and presently preferred embodiments of specific form, it will be appreciated that various changes of a minor nature can be made in these structures without departing from the true spirit of the invention as defined in the appended claims.

What is claimed is:

1. A fluid-current thrust motor comprising a bladed propeller, a fluid compressor coaxially disposed closely adjacent and superposed over the intake surface only of said propeller, and means for relatively rotating said propeller and said compressor at a relative speed sufficient to generate substantial fluid vortex action therebetween; said compressor comprising a plurality of spiral blades constructed and arranged as scoops, to compress at least an annular zone of fluid at the entrance surface only of said propeller.

2. A fluid-current thrust motor comprising a pitched multi-bladed propeller, an open end centrifugal fluid compressor coaxially disposed closely adjacent and superposed over the intake surface only of said propeller, and means for relatively rotating said propeller and said compressor at a relative speed sufficient to generate substantial fluid vortex action therebetween.

3. A fluid-current thrust motor comprising a pitched multi-bladed propeller, an open end centrifugal fluid compressor coaxially disposed closely adjacent and superposed over the intake surface only of said propeller, and means for rotating said propeller and said compressor in opposite rotational directions at a relative speed sufficient to generate substantial fluid vortex action therebetween.

4. A fluid current thrust motor in accordance with claim 1, in which said compressor blades have a common inclination to the axis of rotation of said compressor, to apply an axial component of velocity to fluid leaving said compressor and entering the region of said propeller.

References Cited in the file of this patent

UNITED STATES PATENTS

| | | |
|---|---|---|
| 1,361,276 | Mott | Dec. 7, 1920 |
| 2,361,676 | Baker | Oct. 31, 1944 |
| 2,425,904 | Vernon | Aug. 19, 1947 |
| 2,504,137 | Lewis | Apr. 18, 1950 |

FOREIGN PATENTS

| | | |
|---|---|---|
| 123,095 | Switzerland | Oct. 17, 1927 |
| 775,847 | France | Jan. 10, 1935 |
| 96,362 | Sweden | July 25, 1939 |